United States Patent
Suzuki (10) Patent No.: US 12,198,735 B2
(45) Date of Patent: Jan. 14, 2025

(54) MAGNETIC DISK DEVICE AND REFERENCE PATTERN WRITING METHOD OF THE SAME

(71) Applicants: Kabushiki Kaisha Toshiba, Tokyo (JP); Toshiba Electronic Devices & Storage Corporation, Tokyo (JP)

(72) Inventor: Hiroyuki Suzuki, Fujisawa Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 135 days.

(21) Appl. No.: 18/117,674

(22) Filed: Mar. 6, 2023

(65) Prior Publication Data

US 2024/0079028 A1    Mar. 7, 2024

(30) Foreign Application Priority Data

Sep. 7, 2022  (JP) .................... 2022-142376

(51) Int. Cl.
*G11B 5/012* (2006.01)
*G11B 5/588* (2006.01)
*G11B 5/596* (2006.01)

(52) U.S. Cl.
CPC .............. *G11B 5/012* (2013.01); *G11B 5/588* (2013.01); *G11B 5/59688* (2013.01)

(58) Field of Classification Search
None
See application file for complete search history.

(56) References Cited

U.S. PATENT DOCUMENTS

| | | | |
|---|---|---|---|
| 6,992,852 B1 * | 1/2006 | Ying | G11B 5/59633 360/75 |
| 8,508,880 B2 | 8/2013 | Gao et al. | |
| 9,036,304 B1 | 5/2015 | Galbraith et al. | |
| 9,099,132 B1 | 8/2015 | Grundvig et al. | |
| 9,147,416 B2 | 9/2015 | Grundvig et al. | |
| 9,251,856 B1 | 2/2016 | Wheelock et al. | |
| 9,257,145 B1 | 2/2016 | Soderbloom et al. | |
| 10,068,589 B1 | 9/2018 | Katchmart et al. | |
| 2020/0082848 A1 | 3/2020 | Suzuki et al. | |
| 2021/0082461 A1 | 3/2021 | Tani et al. | |

FOREIGN PATENT DOCUMENTS

| | | | |
|---|---|---|---|
| JP | 2020-042875 A | 3/2020 | |
| JP | 2020-042895 A | 3/2020 | |

* cited by examiner

*Primary Examiner* — Jas A Sanghera
(74) *Attorney, Agent, or Firm* — Maier & Maier, PLLC (57) ABSTRACT

A magnetic disk device detects a shift of writing positions of a spiral pattern, corrects the regulation speed in a direction where the shift is canceled, and writes spiral patterns based on the corrected regulation speed.

7 Claims, 6 Drawing Sheets

MAGNETIC DISK DEVICE AND REFERENCE PATTERN WRITING METHOD OF THE SAME

CROSS-REFERENCE TO RELATED APPLICATIONS

This application is based upon and claims the benefit of priority from Japanese Patent Application No. 2022-142376, filed Sep. 7, 2022, the entire contents of which are incorporated herein by reference.

FIELD

Embodiments described herein relate generally to a magnetic disk device including a magnetic disk and a magnetic head, and a reference pattern writing method of the same.

BACKGROUND

Magnetic disk devices including a magnetic disk and a magnetic head configured to write/read data with respect to the magnetic disk perform a servo pattern writing process with respect to the magnetic disk, which is a process to write a plurality of curved reference patterns which are references for self servo write (SSW) to a blank magnetic disk.

The reference patterns are written in a spiral shape on the magnetic disk from the inner periphery to the outer periphery with a predetermined gap therebetween by moving a head from the inner periphery of the magnetic disk to the outer periphery thereof while the magnetic disk is being rotated. The reference patterns will be referred to as spiral patterns and a set of spiral patterns will be referred to as multi-spiral pattern or spiral sector group.

External force to an acutuator supporting the magnetic head or a flexible circuit board (EPC) cause the gaps between the spiral patterns written to the magnetic disk unstable. In a worst case, a plurality of spiral patterns may possibly cross each other. In such a case, the servo pattern writing process cannot be executed.

DETAILED DESCRIPTION

In general, according to one embodiment, a magnetic disk device includes a magnetic head including a write element for data writing with respect to a rotatable magnetic disk and a plurality of read elements for data read from the disk, the magnetic head freely movable in a radial direction of the magnetic disk; and a controller configured to control rotation and movement of the magnetic disk. The controller includes a first control section configured to write a first reference pattern, which is a reference for a predetermined process with respect to the magnetic disk, to the magnetic disk by the write element while moving the magnetic head in the radial direction of the magnetic disk at a regulated speed; a second control section configured to move the magnetic head in the radial direction of the magnetic disk at the regulated speed in order to track the first reference pattern written by the first control section with each of the read elements; a detection section configured to detect a shift between a locus of the magnetic head moved by the second control section and the first reference pattern written by the first control section based on read signals of each of the read elements; a correction section configured to correct the regulated speed in a direction by which the shift detected by the detection section is canceled, and a third control section configured to write a second reference pattern which is a reference for the predetermined process to the magnetic disk by the write element while moving the magnetic head in a radial direction of the magnetic disk at the regulated speed corrected by the correction section where a predetermined gap is maintained between the first reference pattern and the second reference pattern.

Embodiments will be described hereinafter with reference to the accompanying drawings. Common structures through embodiments will be referred to by the same reference numbers, and explanation considered redundant will be omitted. In addition, each figure is a schematic diagram for better understanding to the embodiments, and the widths, thicknesses, shapes, etc., may differ from the actual devices, and may be arbitrarily changed based on the following description and a publically-known techniques.

(1) First Embodiment

Figure 1:
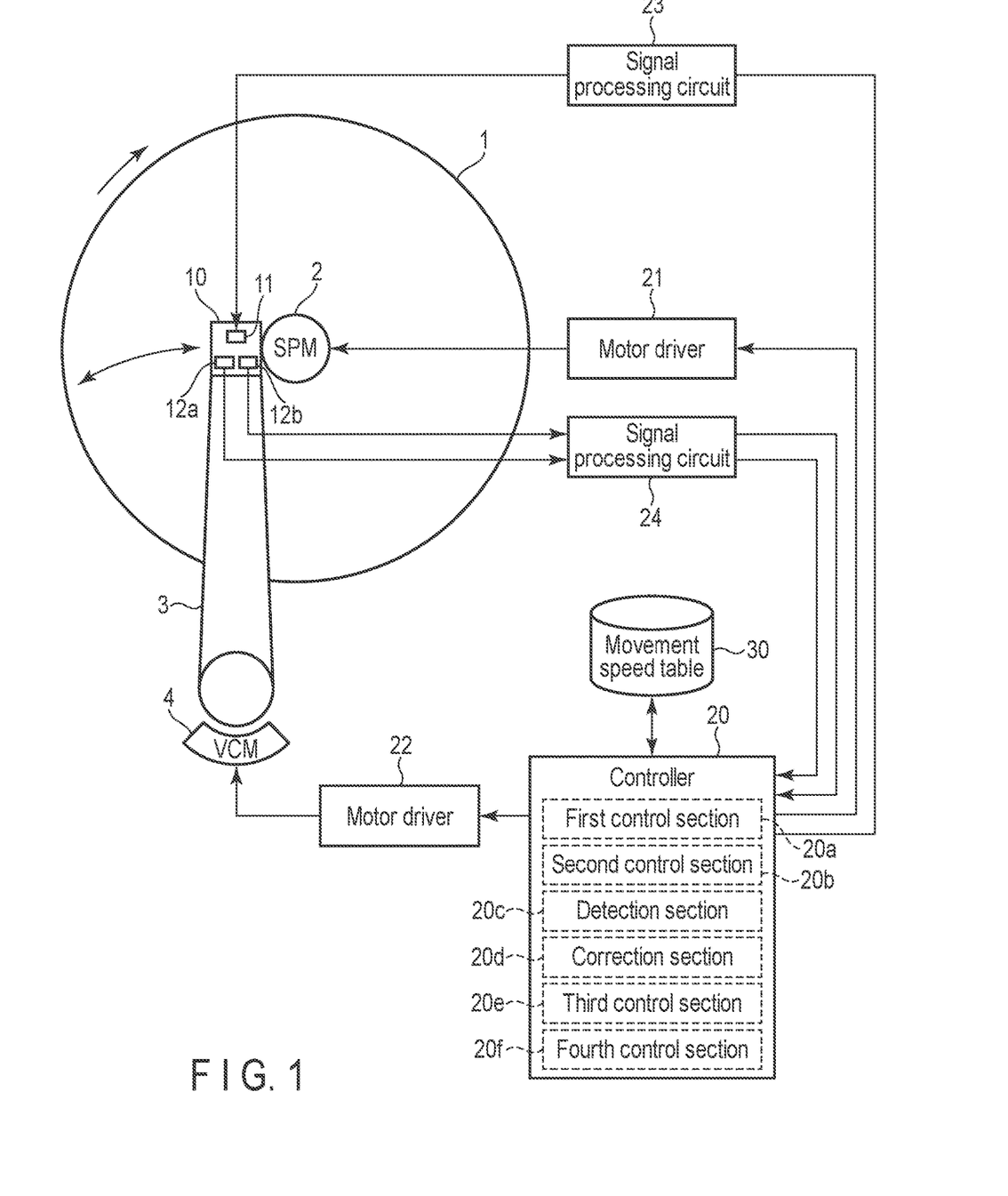
FIG. 1 illustrates the structure of each embodiment.

A magnetic disk device of a first embodiment is illustrated in FIG. 1.

A disk shaped magnetic disk 1 has a center part attached to a rotation shaft of a spindle motor (SPM) 2, and rotates in the direction of an arrow in the figure in response to the motion of the spindle motor (SPM) 2. In the proximity of the magnetic disk 1, an arm-like actuator 3 is disposed.

The actuator 3 has a base end portion which is rotatably supported at a position apart from the magnetic disk 1, and a tip end portion extending to the proximity of the center portion of the magnetic disk 1. A voice coil motor (VCM) 4 is disposed at a position corresponding to the base end portion of the actuator 3, and powered by the voice coil motor 4, the tip end portion of the actuator 3 moves in a radial direction between the inner periphery and the outer periphery of the magnetic disk 1.

A magnetic head 10 corresponding to a two-dimensional magnetic recording (TDMR) is disposed on the tip end portion of the actuator 3. The magnetic head 10 includes a write element 11 configured to write magnetic data to the magnetic disk 1 and two read elements 12a and 12b configured to read magnetic data from the magnetic disk 1, and moves (seeks) in the radial direction of the magnetic disk 1 in accordance to the movement of the actuator 3.

The read element (first read element) 12a and the read element (second read element) 12b are arranged to be aligned along the rotational movement direction of the actuator 3 (radial direction of magnetic disk 1). A gap between the read elements 12a and 12b in the rotational movement direction of the actuator 3 (radial direction of magnetic disk 1) is less than each width of spiral patterns D1 to D2 to be written by the write element 11, which will be described in the latter section. Thus, both the read elements 12a and 12b can be opposed to one spiral pattern.

To a controller 20 which is a central controller of the magnetic disk device, a motor driver 21 configured to drive the spindle motor 2, motor driver 22 configured to drive the voice coil motor 4, signal processor circuit 23 configured to convert write data supplied from the controller 20 to the magnetic disk 1 into analog signals and to amplify the analog signals to the write element 11, signal processor circuit 24 configured to amplify each read signal from the read elements 12a and 12b, to convert the read signals into digital signals, and to supply the digital signals to the controller 20, and a movement speed table 30 configured to determine a movement speed (seeking speed) of the magnetic head 10 are connected.

Figure 2:
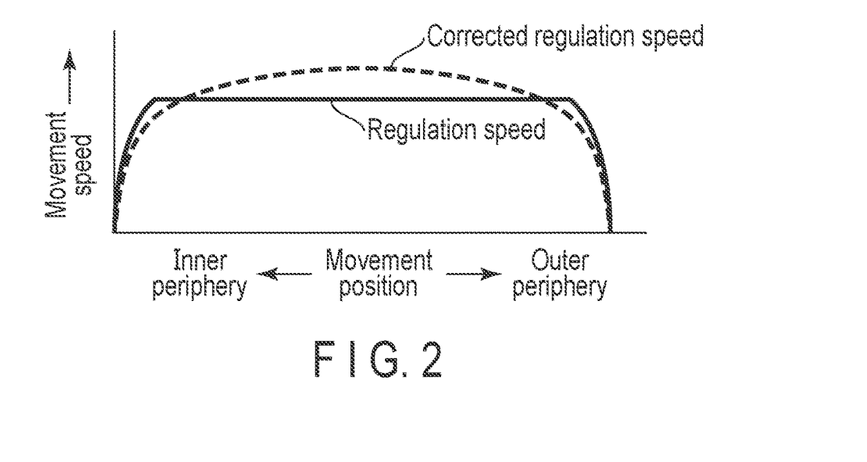
FIG. 2 is a movement speed table of a magnetic head of each embodiment.

The movement speed table 30 stores, as in FIG. 2, regulation speeds of the magnetic head 10 in the radial direction of the magnetic disk 1, used in order to regulate the movement speed of the magnetic head 10 corresponding to movement positions (seeking positions) thereof. The regulation speed is accelerated from zero to a certain value which is maintained for a while, and then is decreased to zero when the magnetic head 10 moves from the innermost periphery to the outermost periphery (forward movement) to and moves from the outermost periphery to the innermost periphery (return movement).

The controller 20 includes, as a main function to control the rotation of the magnetic disk 1 and the movement of the magnetic head 10, which is related to reference pattern writing to the magnetic disk 1, a first control section 20a, second control section 20b, detection section 20c, correction section 20d, third control section 20e, and fourth control section 20f.

The first control section 20a moves (seeks), while the magnetic disk 1 is being rotated at a predetermined certain speed, the magnetic head 10 in the radial direction of the magnetic disk 1 from its innermost periphery to its outermost periphery at a regulation speed corresponding to regulation speed data in the movement speed table 30, and writes a curved first reference pattern, which is a reference for a predetermined process with respect to the magnetic disk 1, to the magnetic disk 1 by the write element 11.

The predetermined process is, for example, a process of writing a servo pattern used for detection of a relative position between each data recording track formed concentrically on the magnetic disk 1 to the magnetic disk 1, that is, a servo pattern writing process.

The control section 20b captures a starting end of the first reference pattern written by the first control section 20a by read signals of the read elements 12a and 12b, and in order to track the captured first reference pattern by the read elements 12a and 12b, moves (seeks) the magnetic head 10 from the innermost periphery to the outermost periphery of the magnetic disk 1 at the regulation speed which is the same as the first control section 20a while the magnetic disk 1 is being rotated at the certain speed.

The detection section 20c detects (learns) a shift between the locus of the magnetic head 10 moved by the second control section 20b for tracking the first reference pattern and the first reference pattern written by the first control section 20a (shift includes shifting direction and shifting amount) by comparing the read signals of the read elements 12a and 12b which are decoded at the same timing.

The shifting direction is a sequential indication of shifts of the first reference pattern with respect to the locus of the movement of the magnetic head 10 when the written first reference pattern and the locus of the movement (seeking) of the magnetic head 10 do not match, where the shifts are as to which of the inner and outer peripheries in the radial direction of the magnetic head 10 the written first reference pattern is shifted for the whole area of the locus of the movement of the magnetic head 10. For example, if the written first reference pattern is shifted more to the inner periphery in the radial direction of the magnetic head 10 than is the locus of the movement of the magnetic head 10, the shifting direction is the inner periphery. If the written first reference pattern is shifted more to the outer periphery in the radial direction of the magnetic head 10 than is the locus of the movement of the magnetic head 10, the shifting direction is the outer periphery.

The shifting amount is a sequential indication of gaps between the written first reference pattern and the locus of the movement of the magnetic head 10 in the radial direction of the magnetic disk 1 when the written first reference pattern and the locus of the magnetic head 10 do not match for the whole area of the locus of the movement of the magnetic head 10.

The correction section 20d corrects (updates) the regulation speed in the direction where the shifts (shifting amount) detected by the detection section 20c is canceled, and stores corrected regulation speed data corresponding to the corrected regulation speed in the movement speed table 30.

The third control section 20e moves, while the magnetic head 1 is being rotated at the certain speed, the head 10 in the radial direction of the magnetic disk 1 from its innermost periphery to its outermost periphery at the regulation speed corrected by the correction section 20d (regulation speed corresponding to corrected regulation speed data), and writes a curved second reference pattern which is a reference for the predetermined process to the magnetic disk 1 by the write element 11 while a predetermined gap is maintained between the first and second reference patterns.

The fourth control section 20f repeats the control of the first control section 20a, control of the second control section 20b, detection of the detection section 20c, correction of the correction section 20d, and control of the third control section 20e in order to curved first to Nth reference patterns which are references for the predetermined process to the magnetic disk 1 while predetermined gaps are maintained between the first to Nth reference patterns.

Figure 3:
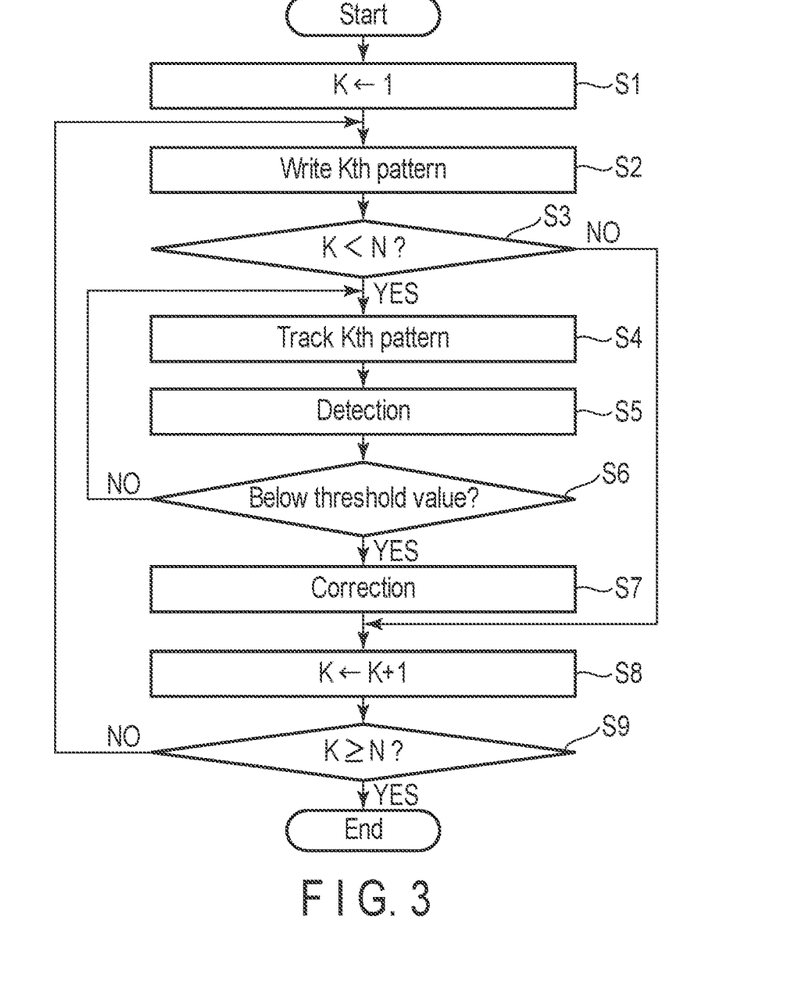
FIG. 3 is a flowchart illustrating the control of a first embodiment.

Now, the control executed by the controller 20 will be explained with reference to a flowchart of FIG. 3.

The controller 20 sets pattern number data K to 1 as an initial process in the writing of each reference pattern with respect to the magnetic disk 1 (S1). Then, as in FIG. 4, the controller 20 moves the magnetic head 10 in the radial direction of the magnetic disk 1 form the innermost periphery to the outermost periphery at a regulation speed corresponding to the regulation speed data in the movement speed table 30 while the magnetic disk 1 is being rotated at a certain speed, and writes a first reference pattern which is based on the pattern number data K (=1), that is, spiral pattern D1 to the magnetic disk 1 by the write element 11 (S2).

Figure 4:
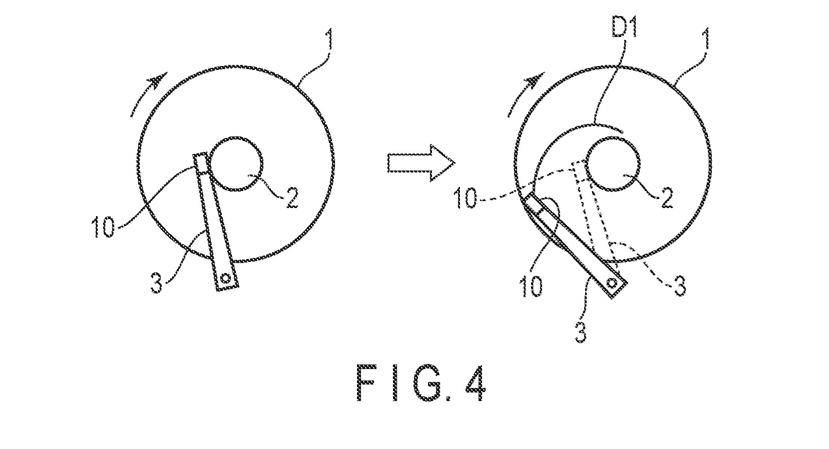
FIG. 4 illustrates a state where a first spiral pattern is written by a write element in each embodiment.
Figure 5:
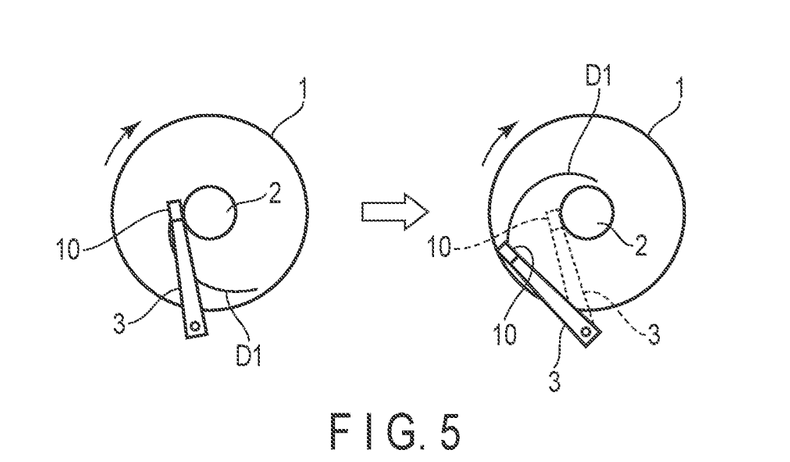
FIG. 5 illustrates a state where the first spiral pattern is tracked by each read element in each embodiment.

The spiral pattern D1 is a magnetic pattern strength of magnetization of which is changed along the writing direction at certain intervals, and is written in a curved shape in accordance with the rotation of the magnetic disk 1 and the movement of the magnetic head 10 on the magnetic disk 1. In FIG. 4, the spiral pattern D1 is shown as having a short entire length; however, the spiral pattern D1 may have a long entire length which repeatedly rounds in the circumferential direction of the magnetic disk 1 in a spiral shape from the inner periphery to the outer periphery of the magnetic disk 1.

Then, the controller 20 determines whether or not the pattern number data K is below N (S3). The pattern number data K (=1) is currently below N (YES in S3), the controller 20 captures an inner peripheral starting end of the written spiral pattern D1 by read signals of the read elements 12a and 12b, and in order to track the captured spiral pattern D1 from its starting end to its finishing end by the read elements 12a and 12b, moves the magnetic head 10 in the radial direction of the magnetic disk 1 from the innermost periphery to the outermost periphery at the same regulation speed as in the writing time of the spiral pattern D1 while the magnetic disk 1 is being rotated at the same certain speed as in the writing time of the spiral pattern D1 (S4).

Figure 6:
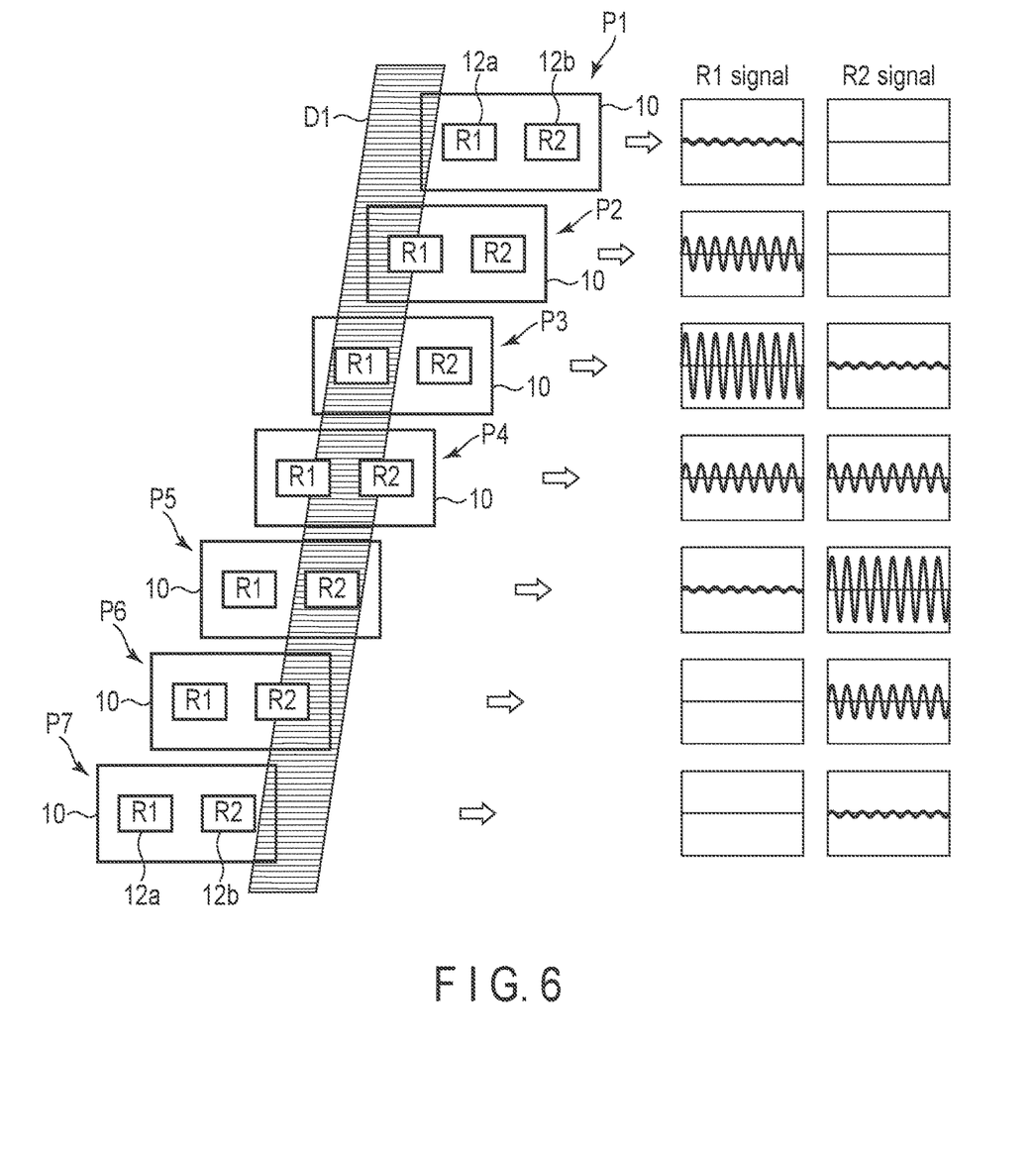
FIG. 6 illustrates changes in corresponding positions between one spiral pattern and each read element in each embodiment, and waveforms of output signals of each read element of the corresponding positions.

The width of the spiral pattern D1 in a direction orthogonal to the writing direction thereof is greater than a gap between the read elements 12a and 12b. Changes in the corresponding positions between the spiral pattern D1 and the read elements 12a and 12b, and voltage waveforms of output signals R1 and R2 of the read elements 12a and 12b corresponding to the corresponding positions are illustrated in FIG. 6.

When an opposing area of the read element 12a with respect to the spiral pattern D1 becomes greater, a voltage amplitude of the output signal R1 of the read element 12a becomes greater. Even if the spiral pattern D1 and the read element 12a are not opposed to each other, when the spiral pattern D1 and the read element 12a are closer, the voltage amplitude of the output signal R1 of the read element 12a becomes greater. When an opposing area of the read element 12b with respect to the spiral pattern D1 becomes greater, a voltage amplitude of the output signal of the read element 12b becomes greater. Even if the spiral pattern D1 and the read element 12b are not opposed to each other, when the spiral pattern D1 and the read element 12b are closer, the voltage amplitude of the output signal R2 of the read element 12b becomes greater.

Specifically, at a corresponding position P1 where the read elements 12a and 12b are shifted from the spiral pattern D1 toward the right area in the figure, a voltage amplitude of the output signal R1 of the read element 12a closer to the spiral pattern D1 is slightly detected, and a voltage amplitude of the output signal R2 of the read element 12b becomes zero. At corresponding positions P2 and P3 where only the read element 12a is opposed to the spiral pattern D1, the voltage amplitude of the output signal R1 of the read element 12a becomes great, and the voltage amplitude of the output signal R2 of the read element 12b becomes small.

At a corresponding position P4 where the read elements 12a and 12b are both opposed to the spiral pattern D1 with equal areas, the voltage amplitudes of the output signals R1 and R2 of the read elements 12a and 12b grow approximately the same. At corresponding positions P5 and P6 where only the read element 12b is opposed to the spiral pattern D1, the voltage amplitude of the output signal R2 of the read element 12b becomes great, and the voltage amplitude of the output signal R1 of the read element 12a becomes small. At a corresponding position P7 where the read elements 12a and 12b are shifted from the spiral pattern D1 toward the left area in the figure, the voltage amplitude of the output signal R2 of the read element 12b closer to the spiral pattern D1 is slightly detected, and the voltage amplitude of the output signal R1 of the read element 12a becomes zero.

The controller 20 detects a shift between the locus of the magnetic head 10 moved for tracking the spiral pattern D1 and the spiral pattern D1 actually written (shift includes shifting direction and shifting amount) by comparing the read signals of the read elements 12a and 12b, for the entirety of the locus of the movement of the magnetic head 10 (S5).

Figure 7:
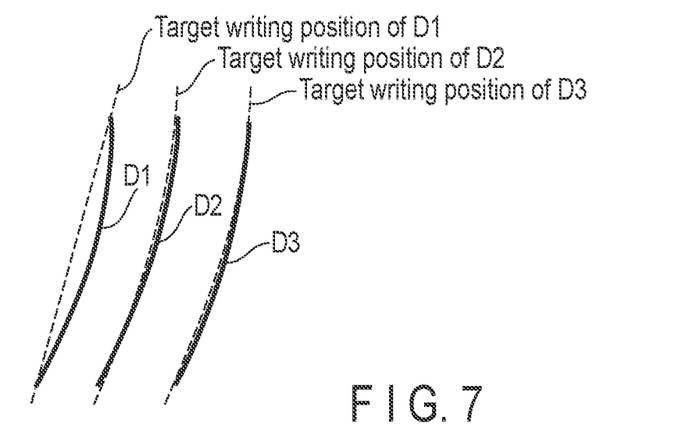
FIG. 7 illustrates a corresponding relationship between write positions of each spiral pattern of each embodiment.

The locus of the magnetic head 10 moved for tracking the spiral pattern D1 corresponds to a target writing position of the spiral pattern D1 determined based on the regulation speed (initial value). FIG. 7 indicates an example where a shift occurs between the target writing position of the spiral pattern D1 and an actual writing position thereof because of various external forces inside the magnetic disk device.

In FIG. 7, a dotted line indicates a target writing position of the spiral pattern D1 (locus of magnetic head 10) and a solid line indicates an actual writing position of the spiral pattern D1. In this example, the actual writing position of the spiral pattern D1 is shifted to be gradually curving to the inner periphery of the radial direction of the magnetic disk 1 with respect to the target writing position of the spiral pattern D1. A gap between the actual writing position of the spiral pattern D1 and the target writing position of the spiral pattern D1 in the radial direction of the magnetic disk 1 is the aforementioned shifting amount. In this case, the shifting amount becomes gradually increase and gradually decrease according to the curving.

If the above detected shifting amount exceeds a threshold value (NO in S6), the controller 20 determines that the locus of the magnetic head 10 moved for tracking the spiral pattern D1 is not proper, and repeats the processes of S4 and S5.

If the above detected shifting amount is within the threshold value (YES in S6), the controller 20 determines that the movement of the magnetic head 10 is proper, and corrects the regulation speed in a direction where the detected shifting amount is canceled, and stores corrected regulation speed data corresponding to the corrected regulation speed in the movement speed table 30 (S7). The corrected regulation speed data stored here is indicated in a dotted line in FIG. 2.

Then, the controller 20 adds 1 to the pattern number data K (=1) (K←K+1), and determines whether or not the pattern number data K (=2) is equal to or greater than N (S9). At that time, the pattern number data K is 2 which is below N (NO in S9), and thus, the controller 20 returns to aforementioned S2, and moves the magnetic head 10 in the radial direction of the magnetic disk 1 from the innermost periphery to the innermost periphery at a corrected regulation speed corresponding to the corrected regulation speed data in the movement speed table 30 while the magnetic disk 1 is being rotated at the same certain speed as in the writing of the spiral pattern D1, and writes a second reference pattern which is a second pattern based on the pattern number data K (=2), that is, spiral pattern D2 to the magnetic disk 1 by the write element 11 while a certain gap is maintained between the spiral patterns D1 and D2 (S2).

The spiral pattern D2 is, as with the spiral pattern D1, a magnetic pattern strength of magnetization of which is changed along the writing direction at certain intervals, and is written in a curved shape in accordance with the rotation of the magnetic disk 1 and the movement of the magnetic head 10.

In the example of FIG. 7, a locus (dotted line) of the target writing position of the spiral pattern D2 corresponding to the corrected regulation speed, and an actual position (solid line) of the spiral pattern D2 actually written based on the corrected regulation speed are similar to the locus (dotted line) of the spiral pattern D1 written under the influence of various external forces in the magnetic disk device. Thus, the spiral pattern D2 does not cross the adjacent spiral pattern D1, and is written while a certain gap is constantly maintained therebetween. The shifting amount in that case, that is, a gap between the actual writing position of the spiral pattern D2 and the target writing position of the spiral pattern D2 is small.

Then, the controller 20 determines whether or not the pattern number data K is below N (S3). At that time, the pattern number data K is 2 which is below N (YES in S3), and thus, the controller 20 captures an inner peripheral starting end of the written spiral pattern D2 by the read signals of the read elements 12a and 12b, and in order to track the captured spiral pattern D2 from its starting end to its finishing end by the read elements 12a and 12b, moves the magnetic head 10 in the radial direction of the magnetic disk 1 from the innermost periphery to the outermost periphery at the same corrected regulation speed as with the writing time of the spiral pattern D2 while the magnetic disk 1 is being rotated at the same certain speed as in the writing time of the spiral pattern D2 (S4).

Then, the controller 20 detects a shift between the locus of the magnetic head 10 moved for tracking the spiral pattern D2 and the actually written spiral pattern D2 (shift includes shifting direction and shifting amount) by comparison between voltage amplitudes of read signals of the read elements 12a and 12b (S5).

If the shifting amount between the locus of the magnetic head 10 moved for tracking the spiral pattern D2 and the actually written spiral pattern D2 is equal to or less than a threshold value (YES in S6), the controller 20 determines that the movement of the magnetic head 10 is proper, and again corrects the corrected regulation speed in a direction where the detected shifting amount is canceled, and updates and stores corrected regulation speed data corresponding to the again-corrected regulation speed in the movement speed table 30 (S7).

Then, the controller 20 adds 1 to the pattern number data K (=2) (K←K+1), and determines whether or not the pattern number data K (=2) is equal to or greater than N (S9). At that time, the pattern number data K is 3 which is below N (NO in S9), and thus, the controller 20 returns to aforementioned S2, and moves the magnetic head 10 in the radial direction of the magnetic disk 1 from the innermost periphery to the innermost periphery at a corrected regulation speed corresponding to the updated corrected regulation speed data in the movement speed table 30 while the magnetic disk 1 is being rotated at the same certain speed as in the writing of the spiral pattern D2, and writes a third reference pattern which is a third pattern based on the pattern number data K (=3), that is, spiral pattern D3 to the magnetic disk 1 by the write element 11 while a certain gap is maintained between the spiral patterns D2 and D3 (S2).

The spiral pattern D3 is, as with the spiral patterns D1 and D2, a magnetic pattern strength of magnetization of which is changed along the writing direction at certain intervals, and is written in a curved shape in accordance with the rotation of the magnetic disk 1 and the movement of the magnetic head 10.

In the example of FIG. 7, a locus (dotted line) of the target writing position of the spiral pattern D3 corresponding to the corrected regulation speed, and an actual position (solid line) of the spiral pattern D3 actually written based on the corrected regulation speed are similar to the locus (dotted line) of the spiral pattern D2 written under the influence of various external forces in the magnetic disk device. Thus, the spiral pattern D3 does not cross the adjacent spiral pattern D2, and is written while a certain gap is constantly maintained therebetween. The shifting amount in that case, that is, a gap between the actual writing position of the spiral pattern D3 and the target writing position of the spiral pattern D3 is small.

Then, the controller 20 determines whether or not the pattern number data K is below N (S3). At that time, the pattern number data K is 3 which is below N (YES in S3), and thus, the controller 20 captures an inner peripheral starting end of the written spiral pattern D3 by the read signals of the read elements 12a and 12b, and in order to track the captured spiral pattern D3 from its starting end to its finishing end by the read elements 12a and 12b, moves the magnetic head 10 in the radial direction of the magnetic disk 1 from the innermost periphery to the outermost periphery at the same corrected regulation speed as with the writing time of the spiral pattern D3 while the magnetic disk 1 is being rotated at the same certain speed as in the writing time of the spiral pattern D3 (S4).

Then, the controller 20 detects a shift between the locus of the magnetic head 10 moved for tracking the spiral pattern D3 and the actually written spiral pattern D3 (shift includes shifting direction and shifting amount) by comparison between the read signals (voltage amplitudes) of the read elements 12a and 12b (S5).

If the shifting amount between the locus of the magnetic head 10 moved for tracking the spiral pattern D3 and the actually written spiral pattern D3 is equal to or less than a threshold value (YES in S6), the controller 20 determines that the movement of the magnetic head 10 is proper, and again corrects the corrected regulation speed in a direction where the detected shifting amount is canceled, and updates and stores corrected regulation speed data corresponding to the again-corrected regulation speed in the movement speed table 30 (S7).

Figure 8:
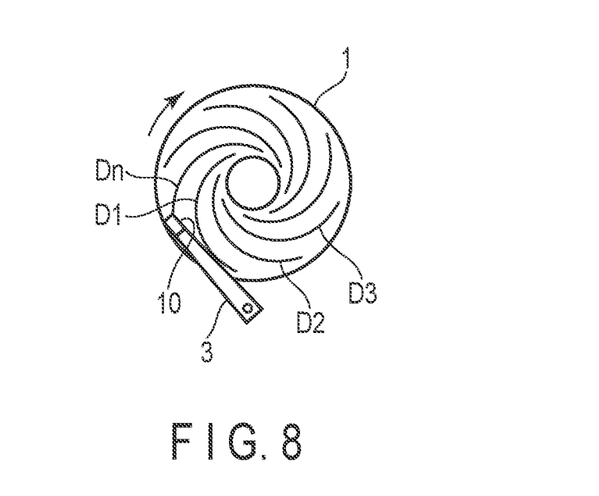
FIG. 8 illustrates a state where first to Nth spiral patterns are written in each embodiment.

The controller 20 repeats the processes of aforementioned S1 to S9, and thus, sequentially detects (learns) shifts of writing positions of first to N−1th spiral patterns D1 to Dn−1, sequentially corrects (updates) regulation speeds in a direction where each shift is canceled, and at the same time, sequentially writes spiral patterns D2 to Dn based on each of the corrected regulation speeds. Thus, first to Nth spiral patterns D1 to Dn can be written in the magnetic disk 1 at proper intervals without crossing each other. Since the spiral patterns D1 to Dn do not cross each other, the servo pattern writing process can be properly executed thereafter.

Figure 9:
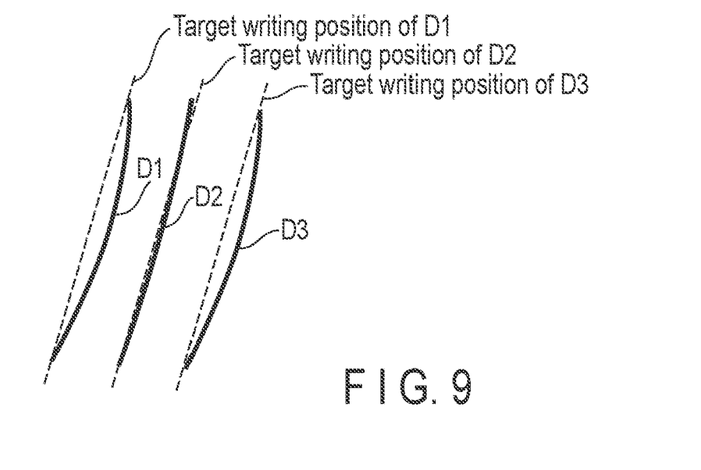
FIG. 9 illustrates a corresponding relationship between write positions of each spiral pattern in a conventional technique for a reference.

A corresponding relationship of writing positions of spiral patterns in a conventional case is indicated in FIG. 9 as a reference. Since regulation speed data is fixed, gaps between written spiral patterns are unstable. In a worst case, multiple spiral patterns may possibly cross each other. In such a case, the servo pattern writing process cannot be executed. The present embodiment can resolve such a problematic case.

(2) Second Embodiment

Throughout the first control section 20a, second control section 20b, detection section 20c, correction section 20d, third control section 20e, fourth control section 20f of the controller 20, only the fourth control section 20f is different from the aforementioned first embodiment.

The fourth control section 20f executes the control of the first control section 20a, control of the second control section 20b, detection of the detection section 20c, and correction of the correction section 20d, and then, repeats the control of the third control section 20e, and thereby, writes curved first to Nth reference patterns which are references for the servo pattern writing process to the magnetic disk 1 while certain gaps are maintained therebetween.

Figure 10:
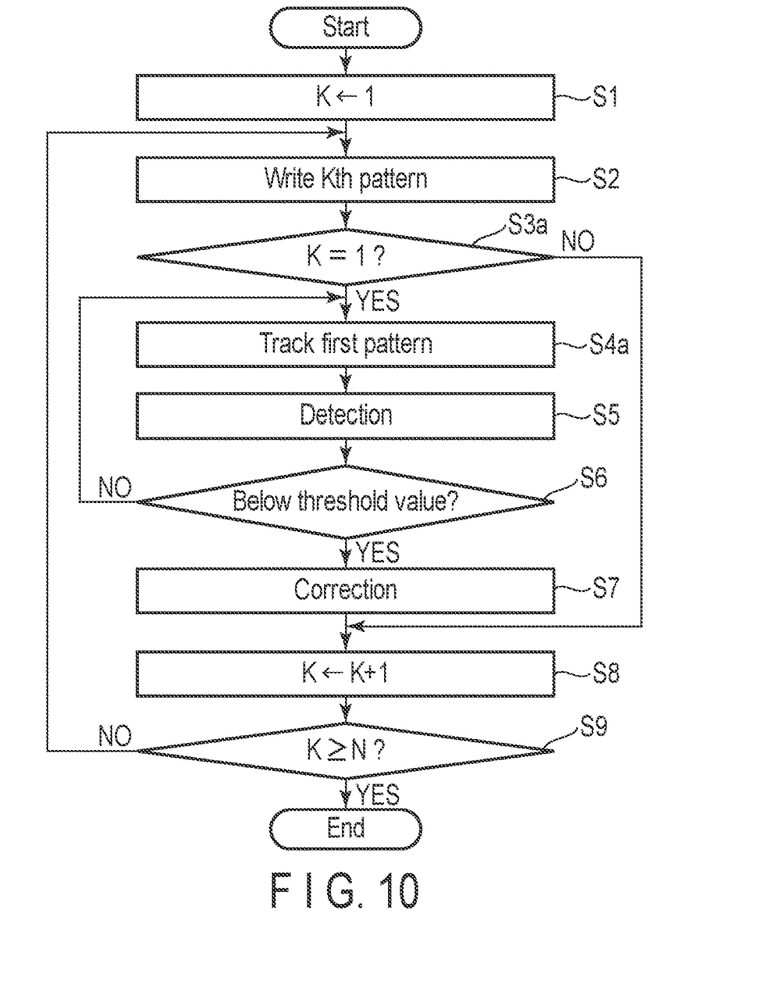
FIG. 10 is a flowchart of a control of a second embodiment.

The controls executed by the controller 20 include, as in the flowchart of FIG. 10, S3a and S4a instead of S3 and S4 of the first embodiment.

That is, the controller 20 determines whether or not the pattern number data K is one after writing a first spiral pattern D1 based on the pattern number data K (=1) (S3a). If the pattern number data K is one (YES in S3a), in order to track the spiral pattern D1 from its starting end to its finishing end by the read elements 12a and 12b, the controller 20 moves the magnetic head 10 in the radial direction of the magnetic disk 1 from the innermost periphery to the outermost periphery at the same corrected regulation speed as in the writing time of the spiral pattern D2 while the magnetic disk 1 is being rotated at the same certain speed as in the writing time of the spiral pattern D2 (S4a). If the pattern number data K is more than one (NO in S3a), the controller 20 goes to S8 to add 1 to the pattern number data K (K←K+1), and if the pattern number data K is below N (NO in S9), repeats the processes from aforementioned S2.

Other processes are the same as in the first embodiment.

That is, the controller 20 detects (learns) a shift of writing positions of the first spiral pattern D1, corrects (updates) the regulation speed in a direction where the shift is canceled, and writes second to Nth spiral patterns D2 to Dn based on the corrected regulation speed. Thus, first to Nth spiral patterns D1 to Dn can be written in the magnetic disk 1 at proper intervals without crossing each other. Since the spiral patterns D1 to Dn do not cross each other, the servo pattern writing process can be properly executed thereafter.

(3) Variation

In each of the aforementioned embodiments, in the detection of shifts of writing positions of spiral patterns, statistical average values of detection results and weighted average values may be calculated, and based on such calculation results, regulation speeds may be corrected.

In each of the aforementioned embodiments, in the reading of regulation speed data and corrected regulation speed data in the movement speed table 30, the data read may be passed through a noise filter or the like for the use such that values of the data read are used as smooth values.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic head including a write element for data writing with respect to a rotatable magnetic disk and a plurality of read elements for data read from the disk, the magnetic head freely movable in a radial direction of the magnetic disk; and
   a controller configured to control rotation and movement of the magnetic disk, wherein
   the controller includes
   a first control section configured to write a first reference pattern, which is a reference for a predetermined process with respect to the magnetic disk, to the magnetic disk by the write element while moving the magnetic head in the radial direction of the magnetic disk at a regulated speed,
   a second control section configured to move the magnetic head in the radial direction of the magnetic disk at the regulated speed in order to track the first reference pattern written by the first control section with each of the read elements,
   a detection section configured to detect a shift between a locus of the magnetic head moved by the second control section and the first reference pattern written by the first control section based on read signals of each of the read elements,
   a correction section configured to correct the regulated speed in a direction by which the shift detected by the detection section is canceled, and
   a third control section configured to write a second reference pattern which is a reference for the predetermined process to the magnetic disk by the write element while moving the magnetic head in a radial direction of the magnetic disk at the regulated speed corrected by the correction section where a predetermined gap is maintained between the first reference pattern and the second reference pattern.

2. The device according to claim 1, wherein
   the read elements are a first read element and a second read element arranged along a movement direction of the magnetic head, and
   the detection section detects the shift by comparison between a read signal of the first read element and a read signal of the second read element.

3. The device according to claim 1, wherein
   the controller further includes
   a fourth control section configured to repeat the process of the first control section, the process of the second control section, the process of the detection section, the process of the correction section, and the process of the third control section in order to write first to Nth reference patterns which are references for the predetermined process where a predetermined gap is maintained each between the first to Nth reference patterns.

4. The device according to claim 1, wherein
   the controller further includes
   a fourth control section configured to repeat the process of the third control section after executing the process of the first control section, the process of the second control section, the process of the detection section, and the process of the correction section in order to write first to Nth reference patterns which are references for the predetermined process where a predetermined gap is maintained each between the first to Nth reference patterns.

5. The device according to claim 1, wherein
   the predetermined process is a servo pattern writing process in which a servo pattern used for detection of a relative position between each track for data recording formed on the magnetic disk and the magnetic head, is written to the magnetic disk.

6. A reference pattern write method for a magnetic disk device, the device including a magnetic head including a write element for data writing with respect to a rotatable magnetic disk and a plurality of read elements for data read from the disk, the magnetic head freely movable in a radial direction of the magnetic disk, and a controller configured to control rotation and movement of the magnetic disk, the method comprising:

writing a first reference pattern, which is a reference for a predetermined process with respect to the magnetic disk, to the magnetic disk by the write element while moving the magnetic head in the radial direction of the magnetic disk at a regulated speed;

moving the magnetic head in the radial direction of the magnetic disk at the regulated speed in order to track the written first reference pattern with each of the read elements;

detecting a shift between a locus of the moving magnetic head and the written first reference pattern based on read signals of each of the read elements, correcting the regulated speed in a direction by which the shift detected is canceled; and writing a second reference pattern which is a reference for the predetermined process to the magnetic disk by the write element while moving the magnetic head in a radial direction of the magnetic disk at the regulated speed corrected where a predetermined gap is maintained between the first reference pattern and the second reference pattern.

7. The method of claim 6, wherein the predetermined process is a servo pattern writing process in which a servo pattern used for detection of a relative position between each track for data recording formed on the magnetic disk and the magnetic head, is written to the magnetic disk.

\* \* \* \* \*